Patented Aug. 7, 1951

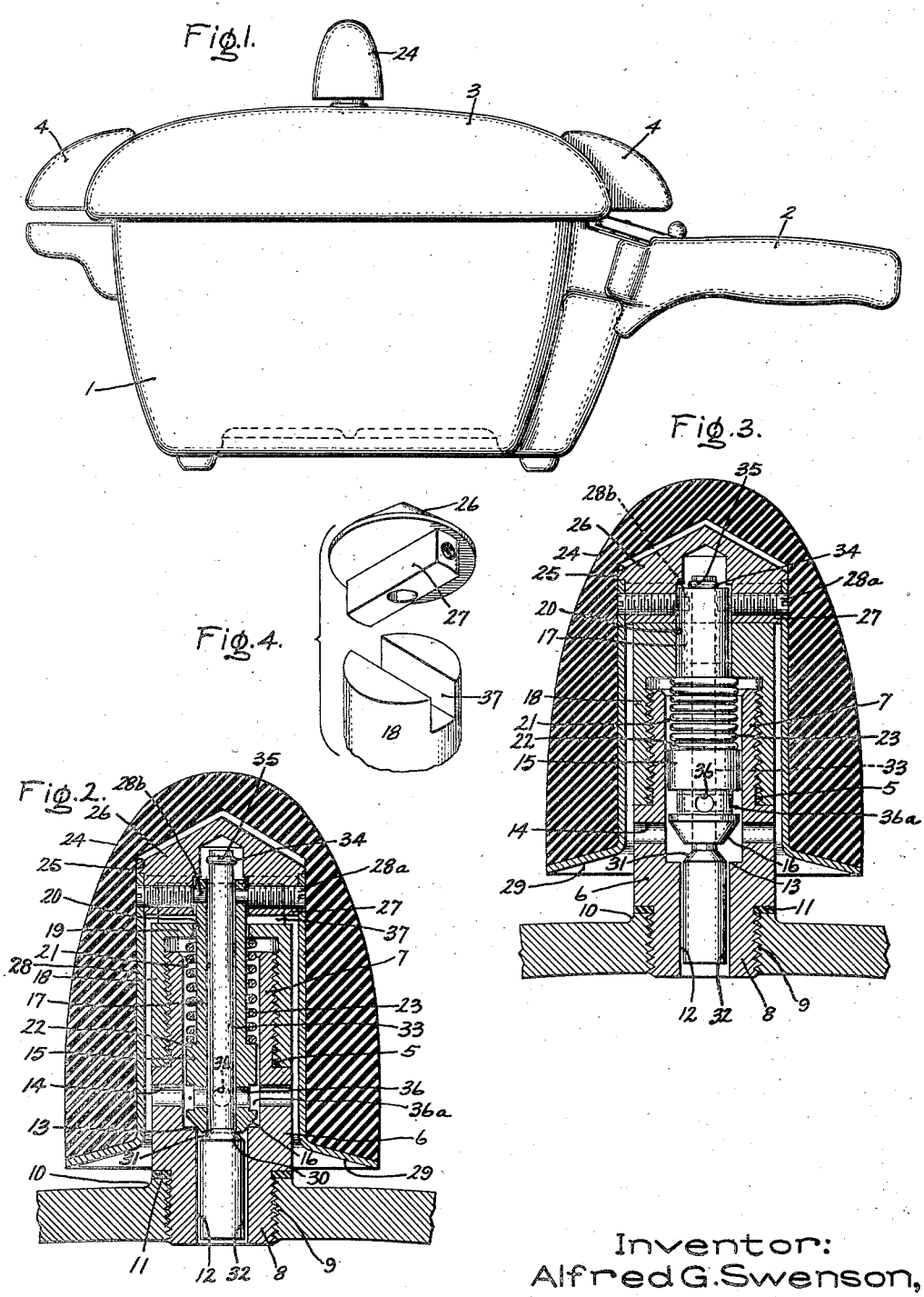

2,563,563

UNITED STATES PATENT OFFICE 2,563,563

COMBINED AIR VENT AND PRESSURE RELEASE VALVE

Alfred G. Swenson, Ontario, Calif., assignor to General Electric Company, a corporation of New York Application May 25, 1946, Serial No. 672,252

4 Claims. (Cl. 137—53)

This invention relates to valves, more particularly to safety valves for pressure cookers and the like, and it has for its object the provision of an improved valve for such an application which will automatically vent the air from the cooker at the start of the cooking operation, then will close to permit steam pressure to build up in the cooker to the cooking pressure and thereafter control the release of steam so as to hold this pressure, and further which is manually operable to release the steam pressure to reduce it substantially to zero at the end of the cooking operation whereby the cooker may be safely opened, all in a simple, reliable, safe and efficient manner.

For a more complete understanding of this invention, reference should be had to the accompanying drawing in which Fig. 1 is a side elevation of a pressure cooker provided with a valve structure arranged in accordance with this invention; Fig. 2 is a vertical sectional view taken through the valve, this figure being drawn to a larger scale than Fig. 1; Fig. 3 is a sectional view similar to Fig. 2 but illustrating the valve structure in a different operative position; and Fig. 4 is an expanded perspective view illustrating certain elements of the valve structure.

Referring to the drawing, this invention has been shown as applied to a pressure cooker having a saucepan-like cooking receptacle 1 provided at its upper end with a laterally extending handle 2. The cooker is provided with a dome-like cover 3 having diametrically positioned handles 4. It will be understood that in cookers of this character the lid 3 will be locked to the receptacle 1 when it is desired to cook under pressure and that suitable sealing means will be provided between the cover and the receptacle to prevent the leakage of pressure.

The air vent and pressure release valve arranged in accordance with this invention comprises a valve body 5 having a central cylindrical section 6 and upper and lower reduced threaded sections 7 and 8. The lower threaded section 8 is threaded into a threaded vent aperture 9 provided for it in the center of the dome-shaped cover 3. Preferably, the cover 3 will have an upright boss 10 around the aperture 9, as shown, and preferably interposed between this boss and the lower end of the cylindrical section 6 is a suitable gasket 11 which renders the connection between the valve body and the lid pressure-tight.

The valve body further comprises a vertically arranged air and steam vent passageway 12 which has its lower end communicating with the interior of the cooking receptacle, and which at its upper end is provided with a valve seat 13. The valve body is further provided in the central cylindrical part 6 with a pair of opposed laterally arranged discharge ports 14 spaced somewhat above the valve seat 13, as shown. Mounted within the valve body to move vertically therein is a vertically positioned tubular valve 15 having at its lower end a valve section 16 coacting with the seat 13, and having a tubular body 17 extending upwardly through the valve body and projecting beyond its upper end.

Threaded upon the upper reduced section 7 of the valve body is a valve cap 18 which has a horizontal top wall 19 provided with a central aperture 20 through which the tubular section 17 of the valve extends. It will be observed that the tubular section 17 has a diameter somewhat smaller than the lower section of the valve upon which the seat 16 is formed so that a space 21 is formed between the tubular section 17 and the threaded section 7 of the valve body; and moreover, so that a shoulder 22 is defined at the point where the tubular section 17 joins the lower larger part of the valve body. Interposed in the space 21 is a helical compression spring 23 which has its lower end bearing on the shoulder 22 and its upper end bearing on the wall 19. This compression spring biases the valve seat 16 into engagement with the valve seat 13 with a predetermined force.

A suitable knob 24 is mechanically connected to the tubular section 17 of the valve. This knob in cross section has roughly a semi-elliptical shape, and preferably it will be formed of a suitable phenol condensation product. The knob 24 is hollowed so as to have formed therein a cylindrical chamber 25 and mounted in the upper end of this chamber and secured to the valve is a conically-shaped key member 26. Depending from this key member 26 is a transverse key 27 having roughly a square cross section, as shown more clearly in Fig. 4. Threaded through apertures provided for them in this key 27 are a pair of opposed setscrews 28a which have inner reduced ends 28b received in apertures provided for them in the upper end of the tubular section 17 of the valve. The setscrews function to secure the key member 26 to the valve, and the key member 26 is secured to the knob 24 by any suitable means, not shown. Thus, the knob 24 is rigidly connected to the valve through the key. In addition, the key member 26 is provided with a downwardly extending cylindrical metallic wall 28 lining the cylindrical aperture 25 of the knob and at its lower end it has a downwardly and outwardly projecting flange 29, the lower section of the knob having a complementary shape.

The valve structure further comprises a second valve seat 30 formed on the very lower end of the seat section 16 of the valve 15, and coacting with this valve seat is a second valve 31 of rod-like form. As shown, the valve 31 has depending therefrom a cylindrical section 32 which extends about to the lower end of the vertical passageway 12 and which has a diameter somewhat smaller than this passageway. In addition, extending upwardly from the valve 31 is a smaller cylindrical rod-like section 33, which extends up through the tubular valve 15 and has its upper end extending from the upper end of the tubular section 17. Mounted upon this upper end and spaced from the upper end of the tubular section 17 is a stop 34 which is in the form of a circular wire mounted in a semi-circular groove 35 provided for it in the upper end of the rod 33. The weight of the rod 33 normally will bias the valve 31 away from its seat 30 and thereby open its seat to the passage 12. The cylindrical valve 15 is provided with a pair of laterally arranged ports 36 which register with the lateral ports 14 when the valve 16 is closed so that when the valve 31 is opened the passageway 12 can vent through the registered ports 36 and 14 to the exterior of the valve body—it being noted that the diameter of rod 33 is less than the internal diameter of the tubular valve 15 so as to provide a venting passage 33 is less than the internal diameter of the tubu- connecting passage 12 with parts 36 and 14. Preferably, the valve 15 will be provided with an annular groove 36a which constitutes a connecting passage between the ports 36 and 14, whereby it is unnecessary that these ports register with each other.

Here it should be noted that the internal diameter of the metallic shield 28 is somewhat larger than is the external diameters of the larger section 6 of the valve body and of the valve cap 18 so that fluids issuing from the port 14 can discharge downwardly in the space between the liner 28 and the valve body and thence discharge outwardly through the conical space defined by the downwardly inclined flange 29. In other words, fluids discharging from the port are directed downwardly and outwardly away from the top surface of the knob 24.

The knob 24 constitutes a manually operable member which may be used to operate the valve structure 16 to open the valve seat 13; and suitable means are provided for holding the valve open rendered operative by rotating the knob once it has been elevated to open the valve seat 13. This means comprises a pair of spaced-apart upright walls 37 shown most clearly in Fig. 4, supported on the top wall 19 of the valve cap and positioned on opposite sides of the key 27 when the valves are closed. When the knob 24 is elevated to raise the key above the upper edges of these walls to open the valve 16, and then is rotated, the key will be brought to a position above the walls, and when the knob is released will rest upon them in order to hold the valve 16 open.

In the operation of the valve, it will be understood that when the pressure cooker lid 3 is closed and heat is first applied to the cooker first of all the air in the cooker is heated up and must be vented. This heated air vents upwardly in the annular space between the rod section 32 and the inner wall surface of the passageway 12, passes through the valve seat 30 which now is open since the valve 31 is held open by its own weight, passes into the annular space between the rod 33 and the tubular valve and then discharges out through the registered ports 36 and 14. When the steam begins to generate and the air has been exhausted, the steam will vent through the valve structure as did the air. But eventually the steam will be generated at such a rate that it cannot escape fast enough and it will act upon the lower end of the valve section 32 and force this valve closed against its seat 30. The pressure in the cooker will then build up until the resultant forces thereof acting upon the exposed surfaces of the valve section 32 and the valve 16 become sufficiently great to overcome the pressure of the spring 23. Steam will then vent through the valve seat 13 and the lateral ports 14 to the exterior of the valve structure. Following this, the valve will reclose, and then again it will open, and so on, and in this way it will prevent the formation of excessive pressure in the cooker.

At the end of the cooking operation it is, of course, necessary to reduce the cooker pressure substantially to zero before it is safe to open the cover 3. This is done by manually grasping the knob 24 and elevating it and then turning it so that the key 27 rests upon the top surfaces of the walls 37. This opens the passageway 12 to the vent ports 14 and permits the steam to escape and reduce to zero pressure.

The depending liner 28 of the knob causes this steam to discharge downwardly and outwardly away from the upper surface of the knob which will be grasped by the operator, and thereby obviates danger of the operator being burned.

When it is again desired to operate the cooker the knob, of course, will be rotated to return it to its position of Fig. 2 wherein the valve structure is again conditioned to vent the cooker of air and to control its steam pressure.

While I have shown a particular embodiment of my invention, it will be understood, of course, that I do not wish to be limited thereto since many modifications may be made and I, therefore, contemplate by the appended claims to cover any such modifications as fall within the true spirit and scope of my invention.

What I claim as new and desire to secure by Letters Patent of the United States is:

1. A combination air vent and steam pressure control valve for pressure cookers and the like comprising, a valve body having therein a vertically arranged air and steam vent passage terminating in a valve seat at its end, a vertically movable tubular valve normally closing said seat, a valve cap surrounding said tubular valve and having an abutment at its upper end, and said tubular valve having a mating abutment intermediate its ends, a compression spring acting on said two abutments so as to force said valve down on said seat with a predetermined force, and said cap further being provided with spaced walls on its upper surface defining a slot between them, a knob connected to said tubular valve for manually elevating it from said seat against the force of said spring but having a key receivable in said slot and when so received permitting said valve to engage said seat, the central passage of said tubular valve opening into said vent passage and constituting an air vent and having a valve seat, a second valve coacting with said second-named seat having a rod extending through said tubular valve and projecting from the upper end thereof, a stop on the upper end of said rod for engaging said valve to limit the movement of said second valve downwardly to a position where it opens said second seat to permit the venting of air into the said tubular valve, and forced upwardly to close said second seat when the steam pressure in said vent passage builds up to a predetermined value, and the two valves thereafter functioning as a single valve unit to control the pressure in said vent passage by opening said first seat when said pressure overcomes the force of said spring and reclosing said seat when said spring overcomes said pressure, and said knob when elevated to remove said key from said slot moving said valves up to open said first seat to release the steam pressure in said vent passage and when rotated moving said key to engage the upper surfaces of said walls so as to hold said valves open.

2. A combination air vent and steam pressure control valve for pressure cookers and the like comprising, a valve body having therein a vertically arranged air and steam vent passage terminating in a valve seat at its end, a vertically movable tubular valve normally closing said seat, a valve cap surrounding said tubular valve and having an abutment at its upper end, and said tubular valve having a mating abutment intermediate its ends, a compression spring acting on said two abutments so as to force said valve down on said seat with a predetermined force, and said cap further being provided with spaced walls on its upper surface defining a slot between them, a knob connected to said tubular valve for manually elevating it from said seat against the force of said spring but having a key receivable in said slot and when so received permitting said valve to engage said seat, the central passage of said tubular valve opening into said vent passage and constituting an air vent and having a valve seat, a second valve coacting with said second-named seat having a rod extending through said tubular valve and projecting from the upper end thereof, a stop on the upper end of said rod for engaging said valve to limit the movement of said second valve downwardly to a position where it opens said second seat to permit the venting of air into the said tubular valve, and forced upwardly to close said second seat when the steam pressure in said vent passage builds up to a predetermined value and the two valves thereafter functioning as a single valve unit to control the pressure in said vent passage by opening said first seat when said pressure overcomes the force of said spring and reclosing said seat when said spring overcomes said pressure, said knob when elevated to remove said key from said slot moving said valves up to open said first seat to release the steam pressure in said vent passage and when rotated moving said key to engage the upper surfaces of said walls so as to hold said valves open, said tubular valve having a lateral discharge port at its lower end leading from said central passage and said valve cap having a registering lateral port which when the valves are opened under the influence of steam pressure is connected with said vertical air and steam vent passage through said first seat, and said knob having an apron which deflects the fluids discharging from said registered port downwardly and outwardly from the top of said knob.

3. A combination air vent and steam pressure control valve for pressure cookers and the like comprising, a valve body having therein a vertically arranged air and steam vent passage terminating in a valve seat at its upper end, a vertically movable tubular valve normally closing said seat, means biasing said valve down to said seat with a predetermined force, the central passage of said tubular valve opening into said vent passage and constituting an air vent and having a valve seat, a second valve coacting with said second-mentioned seat having a rod extending upwardly through said tubular valve, stop means between the two valves for limiting downward movement of said second valve to a position where it opens said second seat to permit the venting of air into the tubular valve and said second valve being forced upwardly to close said second seat when the steam pressure in said vent passage builds up to a predetermined value, and the two valves thereafter functioning as a single valve unit to control the magnitude of pressure in said vent passage by opening when said pressure overcomes the force of said biasing means and reclosing when the biasing means overcomes the pressure, said valve body having a lateral port therein for discharging fluids issuing from said vent passage when said first valve seat is open, and said tubular valve having a lateral port registering with said first-named port when said first valve seat is closed and the second registered port discharging air that issues through said second valve seat when opened, a knob means connected to said tubular valve whereby it may be manually raised to an elevated position to retain said first seat open to discharge the steam from said vent passage, and a shield attached to said knob to move with it and overlapping said first lateral port to deflect fluids discharging therefrom downwardly and outwardly thereby to protect the hand of the operator grasping said knob.

4. A combination air vent and steam pressure control valve for pressure cookers and the like comprising, a valve body adapted to be attached to the pressure vessel and having therein an axial air and steam vent passage terminating in a valve seat at its outer end, an axially movable tubular valve member normally closing said seat, a biasing spring confined within said body and bearing against said tubular valve so as to force said valve against said seat with a predetermined force, a portion of said tubular valve extending outside said valve body, a knob connected to said tubular valve for moving it to its open position against the action of said spring, key means carried by said knob and valve body engageable to retain said valve in its open position and movable to release said tubular valve for closure by said spring, the central passage of said tubular valve opening into said vent passage and constituting an air vent and having a valve seat, a second valve coacting with said second named seat having a rod extending through said tubular valve and projecting from the outer end thereof, a stop on the outer end of said rod for engaging said valve to limit the movement of said second valve to a position where it opens said second seat to permit the venting of air into said tubular valve, said second valve being forced outwardly to close said second seat when the steam pressure in said vent passage builds up to a predetermined value, and the two valves thereafter functioning as a single valve unit to control the pressure in said vent passage by opening the said first seat when said pressure overcomes the force of said spring and reclosing said seat when said spring overcomes said pressure.

ALFRED G. SWENSON.

(References on following page)

REFERENCES CITED

The following references are of record in the file of this patent:

UNITED STATES PATENTS

| Number | Name | Date |
|---|---|---|
| 120,519 | Hibberd | Oct. 31, 1871 |
| 1,326,124 | Vischer | Dec. 23, 1919 |
| 1,638,589 | Louw | Aug. 9, 1927 |
| 1,751,867 | Manuel | Mar. 25, 1930 |
| 2,333,415 | DuBois | Nov. 2, 1943 |
| 2,428,483 | Wittenberg | Oct. 7, 1947 |

FOREIGN PATENTS

| Number | Country | Date |
|---|---|---|
| 7,008 | Great Britain | Apr. 23, 1891 |
| 78,173 | Austria | Sept. 10, 1919 |
| 230,049 | Switzerland | Feb. 16, 1944 |